United States Patent
Tinaphong et al.

(10) Patent No.: US 9,188,325 B2
(45) Date of Patent: Nov. 17, 2015

(54) TRAVEL NIGHTLIGHT WITH USB CHARGER

(71) Applicant: VOXX International Corporation, Hauppauge, NY (US)

(72) Inventors: Prapan Paul Tinaphong, Carmel, IN (US); William Roger Tittle, Indianapolis, IN (US); Henry D. Caskey, Cicero, IN (US); Yiqi W. Woodling, Carmel, IN (US)

(73) Assignee: VOXX International Corporation, Hauppauge, NY (US)

( * ) Notice: Subject to any disclaimer, the term of this patent is extended or adjusted under 35 U.S.C. 154(b) by 396 days.

(21) Appl. No.: 13/736,244

(22) Filed: Jan. 8, 2013

(65) Prior Publication Data

US 2013/0176738 A1 Jul. 11, 2013

Related U.S. Application Data

(60) Provisional application No. 61/584,518, filed on Jan. 9, 2012.

(51) Int. Cl.
| | |
|---|---|
| *H02J 7/00* | (2006.01) |
| *F21V 33/00* | (2006.01) |
| *F21L 13/00* | (2006.01) |
| *F21L 4/00* | (2006.01) |
| *F21V 23/00* | (2015.01) |
| *H01R 33/00* | (2006.01) |
| *F21S 8/00* | (2006.01) |
| *F21V 23/04* | (2006.01) |
| *H02J 7/02* | (2006.01) |
| *F21Y 101/02* | (2006.01) |

(52) U.S. Cl.
CPC ................. *F21V 33/00* (2013.01); *F21S 8/035* (2013.01); *F21V 23/0464* (2013.01); *F21L 4/00* (2013.01); *F21L 13/00* (2013.01); *F21Y 2101/02* (2013.01); *H02J 7/02* (2013.01); *H02J 2007/0062* (2013.01)

(58) Field of Classification Search
CPC ....... H02J 7/00; H02J 7/02; H02J 2007/0062; F21V 33/00; F21V 23/0464; F21L 4/00; F21L 13/00; H01R 33/00; F21S 8/035; F21Y 2101/02
USPC ............. 320/114, 115, 111; 362/183, 651, 95
See application file for complete search history.

(56) References Cited

U.S. PATENT DOCUMENTS

| | | | |
|---|---|---|---|
| 2,636,096 A | 4/1953 | Di Blasi | 337/189 |
| D195,463 S | 6/1963 | Tamarin | D13/137.4 |
| 4,960,384 A | 10/1990 | Singer et al. | 439/155 |

(Continued)

OTHER PUBLICATIONS

Related U.S. Appl. No. 13/542,828, filed Jul. 6, 2012.

(Continued)

*Primary Examiner* — Phallaka Kik
(74) *Attorney, Agent, or Firm* — Gerald T. Bodner

(57) ABSTRACT

A nightlight charger for charging an external electronic device is mountable to a common 120 volt AC wall outlet, and includes a power supply to convert the 120 volts AC to +5 volts DC, and a charging profile configuration circuit. A charging profile selection switch is provided for the user to select a desired charging profile that is compatible with the electronic device to be charged. The nightlight includes a housing having a side wall, a portion of which is translucent. A light emitting device within the housing emits light that passes though the translucent portion of the side wall.

7 Claims, 7 Drawing Sheets

(56) References Cited

U.S. PATENT DOCUMENTS

| | | | |
|---|---|---|---|
| D312,615 S | 12/1990 | Schwartz | D13/139 |
| D316,484 S | 4/1991 | Kounis et al. | D3/104 |
| 5,313,152 A | 5/1994 | Wozniak et al. | 320/6 |
| D348,775 S | 7/1994 | Scheid | D3/218 |
| 5,327,065 A | 7/1994 | Bruni et al. | 320/2 |
| D350,938 S | 9/1994 | Rossman et al. | D13/139 |
| D357,460 S | 4/1995 | Lovett | D13/143 |
| D361,315 S | 8/1995 | Wedell et al. | D13/160 |
| 5,619,578 A | 4/1997 | Sondermeyer et al. | 381/61 |
| D379,160 S | 5/1997 | Johansson et al. | D11/216 |
| D401,219 S | 11/1998 | Stekelenburg | D13/137.2 |
| D408,355 S | 4/1999 | Welsh et al. | D13/139.4 |
| 5,923,147 A | 7/1999 | Martensson | 320/111 |
| 5,955,791 A | 9/1999 | Irlander | 307/38 |
| D415,067 S | 10/1999 | Tung | D11/200 |
| D428,327 S | 7/2000 | Stekelenburg | D8/359 |
| D432,499 S | 10/2000 | Stekelenburg | D13/139.6 |
| D434,344 S | 11/2000 | Nezu | D11/216 |
| D440,203 S | 4/2001 | Ewing et al. | D13/137.2 |
| D442,550 S | 5/2001 | Tong et al. | D13/137.2 |
| D447,087 S | 8/2001 | Hodge | D11/200 |
| D461,746 S | 8/2002 | Olson et al. | D11/201 |
| D468,848 S | 1/2003 | Schenck | D26/26 |
| D469,062 S | 1/2003 | Nieto et al. | D13/137.2 |
| 6,510,067 B1 | 1/2003 | Toebes | 363/146 |
| D477,792 S | 7/2003 | Kaneko et al. | D11/200 |
| 6,614,206 B1 | 9/2003 | Wong et al. | 320/136 |
| D481,357 S | 10/2003 | Stekelenburg | D13/139.8 |
| D483,724 S | 12/2003 | Wu | D13/139.7 |
| D486,126 S | 2/2004 | Aromin | D13/137.2 |
| D495,657 S | 9/2004 | Lee | D13/137.2 |
| 6,790,062 B1 | 9/2004 | Liao | 439/171 |
| 6,821,134 B2 | 11/2004 | Chen | 439/131 |
| 6,960,727 B2 | 11/2005 | Hering | 174/135 |
| D514,067 S | 1/2006 | Lee | D13/137.2 |
| 7,050,285 B2 | 5/2006 | Sato et al. | 361/119 |
| 7,140,922 B2 * | 11/2006 | Luu et al. | 439/651 |
| 7,170,259 B2 * | 1/2007 | Veselic | 320/114 |
| 7,212,420 B2 | 5/2007 | Liao | 363/146 |
| 7,303,416 B1 | 12/2007 | Liao | 439/173 |
| D567,708 S | 4/2008 | Jallen | D11/200 |
| D568,785 S | 5/2008 | Yang et al. | D11/218 |
| D582,346 S | 12/2008 | Zhou | D13/137.2 |
| D586,691 S | 2/2009 | Snell | D11/214 |
| D588,065 S | 3/2009 | Wadsworth et al. | D13/137.2 |
| 7,520,783 B2 | 4/2009 | Chou et al. | 439/652 |
| D606,545 S | 12/2009 | Salmon | D14/434 |
| D616,817 S | 6/2010 | Walker et al. | D13/119 |
| D618,175 S | 6/2010 | Shi | D13/137.2 |
| D619,535 S | 7/2010 | Shi | D13/137.2 |
| 7,824,051 B2 * | 11/2010 | Walter et al. | 362/101 |
| 7,997,925 B2 | 8/2011 | Lam et al. | 439/535 |
| 8,072,183 B2 | 12/2011 | Griffin, Jr. | 320/107 |
| D651,974 S | 1/2012 | Benedetti | D13/137.2 |
| 8,358,100 B2 * | 1/2013 | Helfrich | 320/106 |
| 2004/0121648 A1 | 6/2004 | Voros | 439/535 |
| 2005/0041827 A1 | 2/2005 | Wu | 381/323 |
| 2007/0108938 A1 * | 5/2007 | Veselic | 320/111 |
| 2007/0273325 A1 | 11/2007 | Krieger et al. | 320/106 |
| 2007/0285053 A1 * | 12/2007 | Noguchi et al. | 320/114 |
| 2008/0012536 A1 | 1/2008 | Glass | 320/165 |
| 2008/0073117 A1 * | 3/2008 | Misener | 174/535 |
| 2008/0111522 A1 * | 5/2008 | Simpson et al. | 320/162 |
| 2008/0140887 A1 | 6/2008 | Gallant et al. | 710/110 |
| 2008/0150480 A1 * | 6/2008 | Navid | 320/113 |
| 2008/0157715 A1 | 7/2008 | Rosenboom et al. | 320/108 |
| 2008/0164845 A1 | 7/2008 | Choi | 320/115 |
| 2008/0174265 A1 | 7/2008 | Toya | 320/107 |
| 2008/0183909 A1 * | 7/2008 | Lim et al. | 710/14 |
| 2008/0231233 A1 | 9/2008 | Thornton | 320/137 |
| 2009/0015198 A1 | 1/2009 | Brandenburg | 320/115 |
| 2009/0284219 A1 * | 11/2009 | Meek | 320/107 |
| 2009/0301927 A1 * | 12/2009 | Fvlbrook et al. | 206/564 |
| 2010/0029109 A1 * | 2/2010 | Lam et al. | 439/136 |
| 2010/0090528 A1 * | 4/2010 | Makwinski | 307/31 |
| 2010/0201308 A1 | 8/2010 | Lindholm | 320/107 |
| 2010/0219790 A1 | 9/2010 | Chadbourne et al. | 320/107 |
| 2011/0016334 A1 | 1/2011 | Tom et al. | 713/300 |
| 2011/0029703 A1 | 2/2011 | Huo et al. | 710/110 |
| 2011/0050164 A1 | 3/2011 | Partovi et al. | 320/108 |
| 2011/0084660 A1 * | 4/2011 | McSweyn | 320/111 |
| 2011/0276734 A1 | 11/2011 | Helfrich | 710/105 |
| 2012/0119695 A1 * | 5/2012 | Pin | 320/107 |
| 2012/0169272 A1 * | 7/2012 | Khalepari | 320/107 |
| 2012/0258632 A1 | 10/2012 | Lee et al. | 439/660 |
| 2013/0175977 A1 * | 7/2013 | Tinaphong et al. | 320/107 |
| 2013/0175992 A1 * | 7/2013 | Tinaphong et al. | 320/111 |
| 2013/0260613 A1 * | 10/2013 | Misener | 439/653 |
| 2014/0104805 A1 * | 4/2014 | Row et al. | 361/807 |

OTHER PUBLICATIONS

Related U.S. Appl. No. 13/736,140, filed Jan. 8, 2013.
The International Search Report (in English), dated Mar. 19, 2013, and the Written Opinion of the International Searching Authority (in English), dated Mar. 19, 2013, issued in Applicant's corresponding PCT Application No. PCT/US2013/020638 filed on Jan. 8, 2013, by the International Searching Authority of the U.S. Patent and Trademark Office.

* cited by examiner

TRAVEL NIGHTLIGHT WITH USB CHARGER

CROSS-REFERENCE TO RELATED APPLICATIONS

This application is related to U.S. Provisional Application Ser. No. 61/584,518, filed on Jan. 9, 2012, and entitled "Travel Nightlight with USB Charger", the disclosure of which is incorporated herein by reference and on which priority is hereby claimed.

BACKGROUND OF THE INVENTION

1. Field of the Invention

The present invention relates to nightlights, and in particular relates to compact travel-size nightlights.

2. Description of the Prior Art

Traditional nightlights and, in particular, compact travel-size nightlights, plug into a wall outlet to power a light integrated into or mounted on the housing for the nightlight. However, the traditional nightlights or travel nightlights cannot function to charge an electronic device.

OBJECTS AND SUMMARY OF THE INVENTION

It is an object of the present invention to provide a nightlight which is pluggable into a wall outlet and which not only provides a nightlight function but also is capable of charging an electronic device.

In accordance with one form of the present invention, a nightlight which is adapted to plug into an ordinary AC power wall outlet includes a housing having a translucent or transparent, ring-shaped segment and a light pipe situated internally of the housing and in proximity to the ring-shaped segment of the housing. A USB port is situated on a wall of the housing, preferably the front wall thereof, and is connected to circuitry within the housing of the nightlight to provide a voltage on the USB port. In this way, the user of the nightlight may connect an external electronic device, such a cellular phone, PDA (personal digital assistant) or a camera, to charge the electronic device through a cable connected between the electronic device and the USB port of the nightlight. A switch is preferably provided on the housing so that the user may select a particular charging current and/or voltage that is comparable for charging different electronic devices connected to the nightlight.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1E:
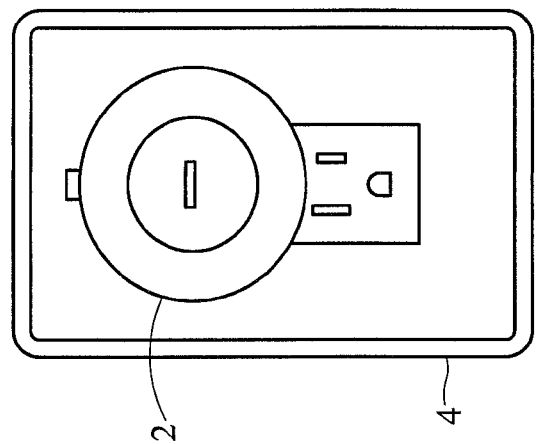
FIG. 1E is a front view of a first embodiment of a nightlight having charger capabilities formed in accordance with the present invention and shown mounted on an AC power wall outlet.
Figure 1C:
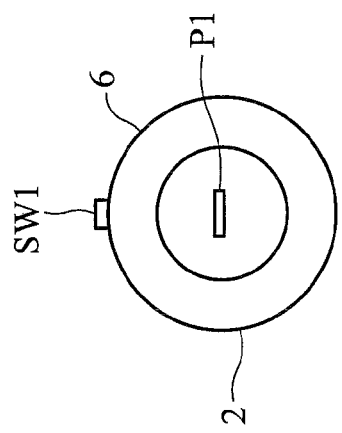
FIG. 1C is a front view of a first embodiment of a nightlight having charger capabilities formed in accordance with the present invention.
Figure 1D:
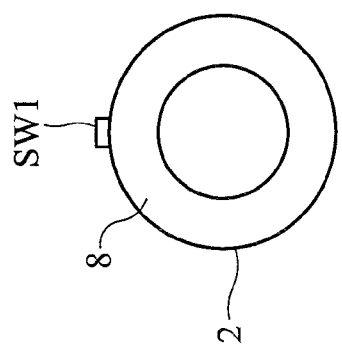
FIG. 1D is a rear view of a first embodiment of a nightlight having charger capabilities formed in accordance with the present invention.
Figure 1A:
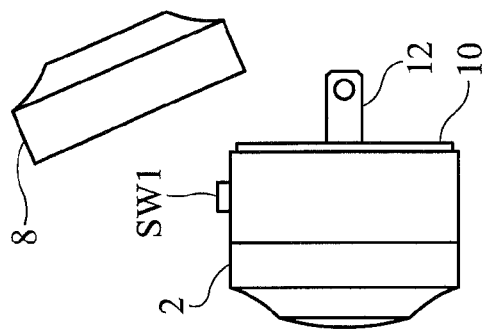
FIG. 1A is an exploded, side view of a first embodiment of a nightlight having charger capabilities formed in accordance with the present invention.
Figure 1B:
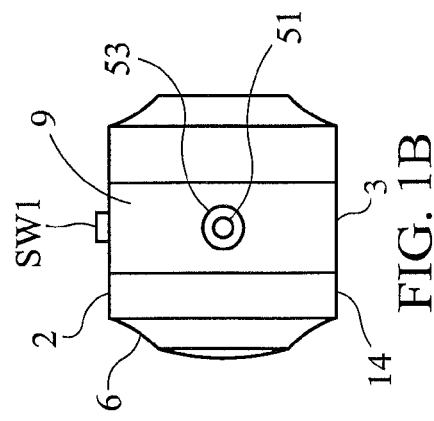
FIG. 1B is a side view of a first embodiment of a nightlight having charger capabilities formed in accordance with the present invention.
Figure 2E:
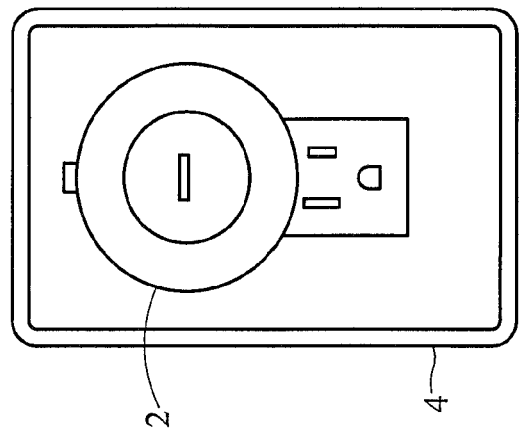
FIG. 2E is a front view of a second embodiment of a nightlight having charger capabilities formed in accordance with the present invention and shown mounted on an AC power wall outlet.
Figure 2C:
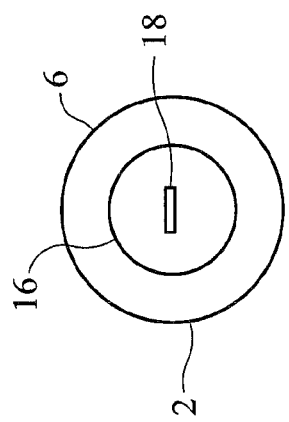
FIG. 2C is a front view of a second embodiment of a nightlight having charger capabilities formed in accordance with the present invention.
Figure 2D:
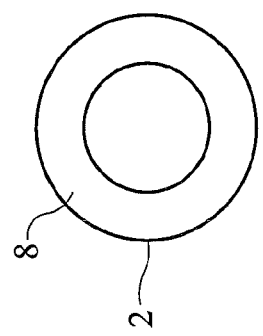
FIG. 2D is a rear view of a second embodiment of a nightlight a nightlight having charger capabilities formed in accordance with the present invention.
Figure 2A:
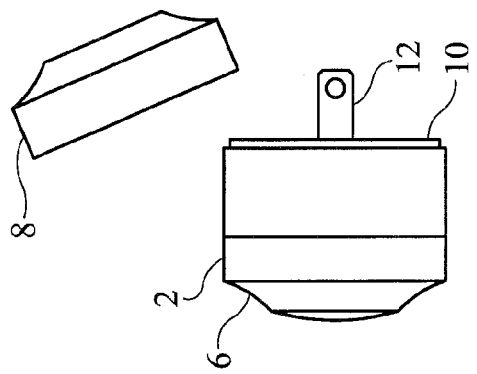
FIG. 2A is an exploded, side view of a second embodiment of a nightlight having charger capabilities formed in accordance with the present invention.
Figure 2B:
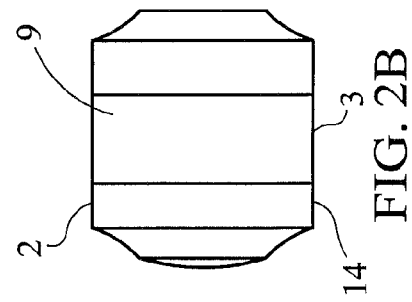
FIG. 2B is a side view of a second embodiment of a nightlight having charger capabilities formed in accordance with the present invention.

Two preferred forms of a nightlight having charging capability for an external electronic device are shown in FIGS. 1A-1E and 2A-2E of the drawings. They are similar in structure and function, except that the second preferred embodiment shown in FIGS. 2A-2E includes a ring 18 situated on or about the front wall of the nightlight, which can illuminate in different colors by one or more LEDs as a charging status indicator 16 to indicate the charge condition of the electronic device connected to the nightlight. Furthermore, in one of the embodiments, such as shown in FIGS. 1A-1E, the nightlight may include a slide or push button switch SW1 preferably mounted on an exposed wall, such as a side wall, of the nightlight housing 2 so that the switch SW1 is accessible to the user of the nightlight to change charging profile voltages on a USB charging port P1, as will be described in greater detail.

The nightlight of the present invention includes a housing 2 which is preferably cylindrical in form but may be cubicle in shape or have any other geometrical shapes, such as rectangular, square, oval, trapezoidal or polygonal. However, the preferred dimensions of the housing 2 of the nightlight is such that it can fit into one outlet of an AC receptacle wall plate 4, as shown in the drawings, leaving other outlets of the wall plate 4 uncovered and free to use for other purposes.

Preferably, the cylindrical housing 2 includes a segmented main body 3 having a front wall portion 6, a removable rear wall portion 8 which is formed as a cap, and a side wall 9. The rear wall portion 8, or cap, fits onto and is removable from a rear wall 10 of the main body 3 of the housing 2. A pair of male electrical prongs 12 extend outwardly from the rear wall 10 of the main body 3 of the housing, and is covered and uncovered by the removable rear portion or cap 8. The rear portion or cap 8 fits snuggly against a portion of the rear wall 10 which extends outwardly from the main body 3 of the housing and which has a reduced diameter that is less than the outer diameter of the main body 3 of the housing. The prongs 12 are covered, and are not exposed, when the rear portion or cap 8 is fitted onto the rear wall 10 of the main body 3 of the housing 2.

As can be seen in FIGS. 1A-1E and FIGS. 2A-2E of the drawings, the front, ring-shaped segment 14 of the cylindrical side wall of the main body 3 of the housing is translucent or transparent, and preferably is formed with a light blue color. A light pipe 56 (see FIG. 3B) is situated within a cavity defined by the housing 2 and in proximity to the ring-shaped translucent segment 14 of the main body. The light pipe 56 is illuminated by one or more light emitting diodes (LEDs) 54 situated adjacent an LED axial end or ends 57 of the light pipe 56, and light from the LED or LEDs 54 is distributed by the light pipe about the circumference of the translucent segment 14 of the main body of the housing 2 to provide a soft, diffused, light blue light emitted radially outwardly from the side wall 9 of the housing 2 of the nightlight, when the LED 54 is energized. The nightlight shown in FIGS. 1 and 2 of the drawings is quite suitable for travel purposes, and is compact in shape. The electrical prongs 12 are covered by the rear portion or cap 8, until removed by the user, so that the prongs do not inadvertently damage any clothing or mar any electronic devices or other items that may be contained in luggage when the user is traveling.

Normally, a traditional nightlight or compact travel-size nightlight does not have any built-in USB charger function, so it cannot provide any power source to recharge any portable USB devices. The present invention, on the other hand, integrates a small USB charger function into a nightlight, in order to provide a regulated DC voltage of preferably five volts and a controlled current source from a few hundred milliamperes up to a few amperes (for example, about three amperes), in order to recharge practically all hand-held portable devices which can be recharged through a regular USB port, such as a smartphone, internet tablet, MP3 player, handheld gaming device, iPhone™ cellular telephone, iPad™ device, camera and the like. Thus, the nightlight of the present invention combines a new design of a nightlight and a USB charger having a charging status indicator into a compact size.

When the nightlight of the present invention is plugged into an AC outlet 4, it will work as a normal nightlight, and its LED or LEDs 54 will illuminate when the room or ambient light conditions of the environment in which it is situated is dark. This nightlight function is preferably controlled by a photosensor 51 to detect, adjust and control the function of the LED or LEDs 54. Alternatively, no photosensing circuit is provided, and the nightlight LED 54 remains on as long as the nightlight is plugged into the wall outlet.

A charging status indicator 16, which may be a small LED emitting amber colored light, or a series connection of LEDs, will be activated and light up to indicate the charge condition when charging has just started or is still in progress. The light illuminated by the LED or LEDs of the charging status indicator 16 preferably passes through a circular window or ring 18 formed on the front wall portion 6 of the housing 2 and preferably encircling the USB port P1 situated thereon. The LED or LEDs may pulsate or flash until the device or load is fully charged, and then, preferably, this charging status indicator 16 will change from a flashing amber light to a solid or steady light, or will change its color from amber to green, for example. By having such a charging status indicator light 16, the nightlight charger of the present invention will help users to see when their smartphones or other electronic devices are fully charged and ready to use.

Figure 3C:
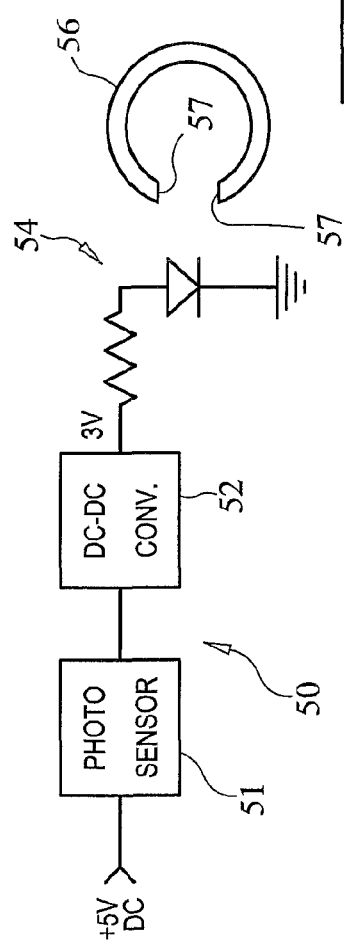
FIG. 3C is a block diagram of a photosensing circuit used in the nightlight charger of the present invention.
Figure 3A:
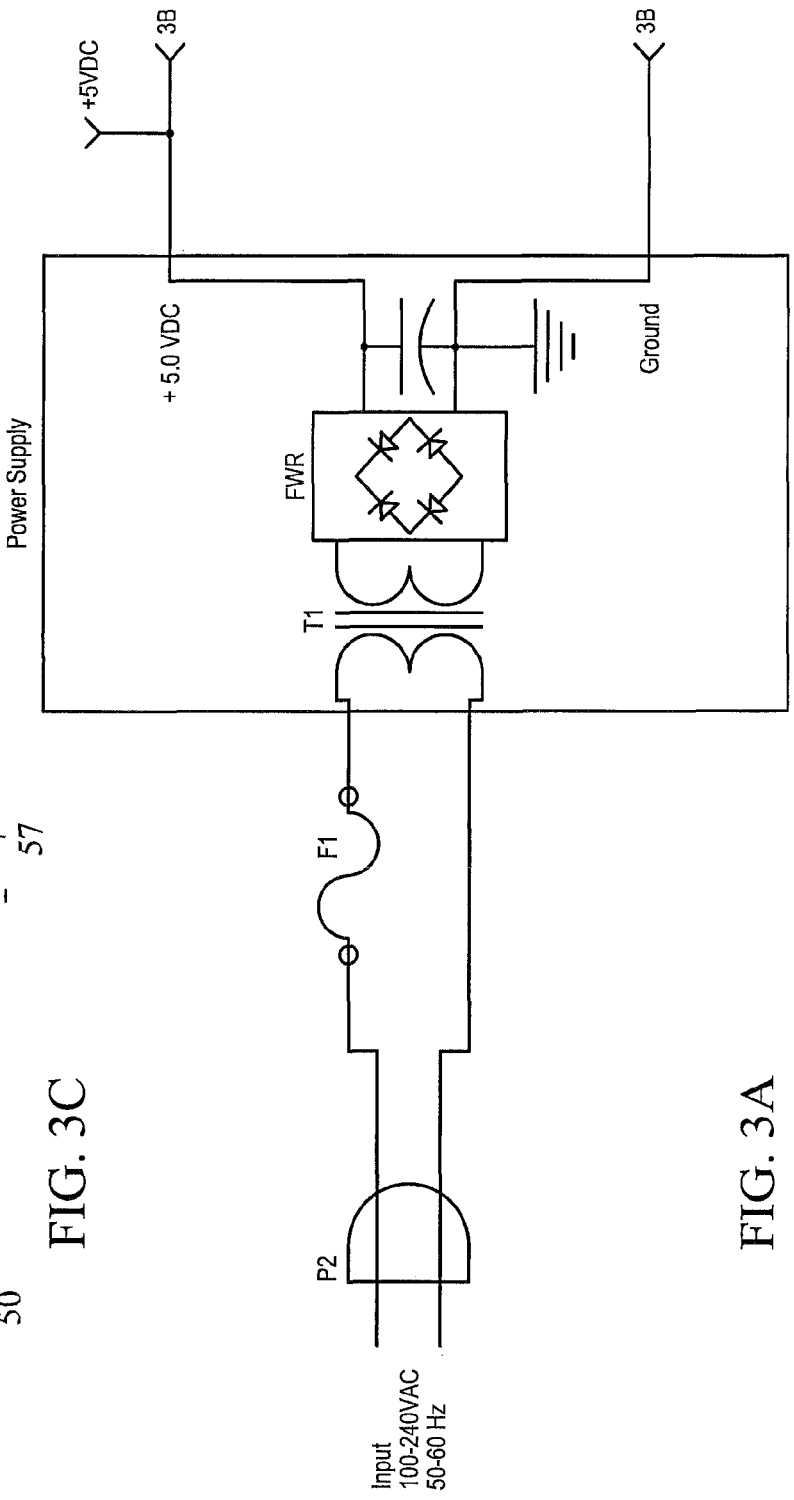
FIGS. 3A and 3B are portions of a block diagram of a preferred circuit of the nightlight charger of the present invention.
Figure 3B:
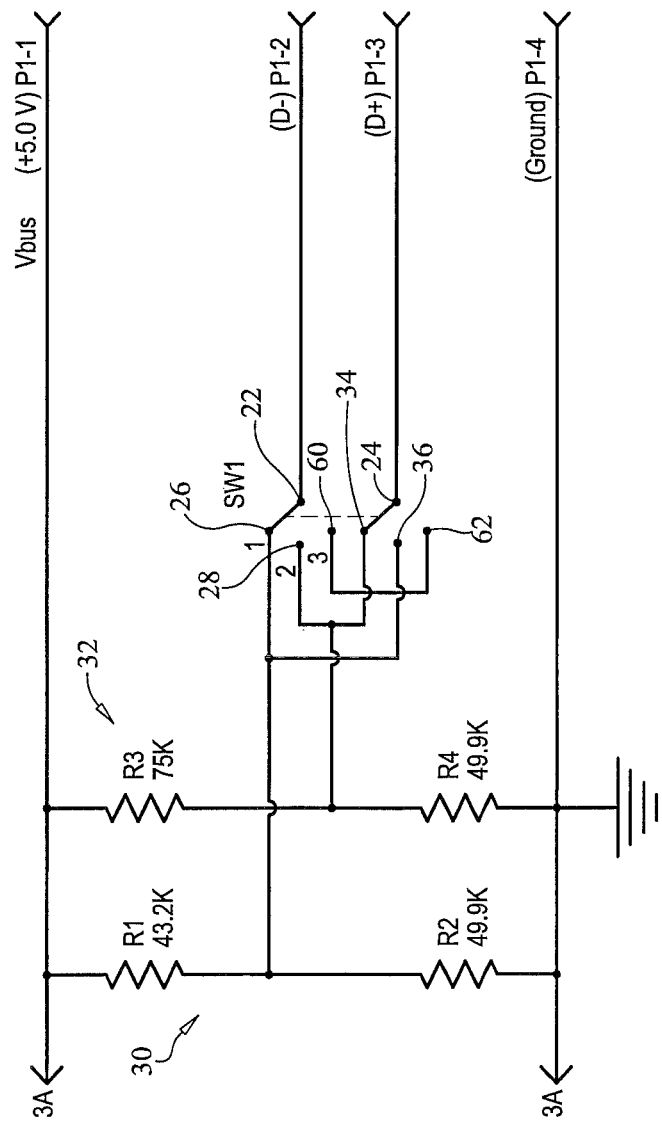

FIGS. 3A and 3B are portions of a block diagram of a preferred form of the electronic circuit of the nightlight of the present invention. As mentioned previously, the main body 3 of the housing 2 defines an interior cavity in which the electronic circuit of the nightlight is situated. The electrical prongs 12 extending from the rear wall 10 of the nightlight are connected to a 120 volt AC primary winding of a transformer T1, forming part of a power conversion circuit. The transformer T1 includes a secondary winding that provides a reduced voltage (still AC) as an output voltage. The output voltage of the transformer T1 is provided to a full wave rectifier circuit FWR, also a part of the power conversion circuit, which may be in the form of a bridge circuit containing a plurality of diodes, and the output of the rectifier circuit is provided to a filter capacitor C1, also a part of the power conversion circuit, to remove any ripple on the DC-generated signal in order to provide a five volt DC output voltage. This five volt DC output voltage provided by the power conversion circuit will be used to power an external electronic device connected via a cable to the USB port P1 situated on the front wall 6 of the nightlight.

As shown in FIG. 3C, the five volt DC voltage is also provided to a photosensor circuit 50 which controls the illumination of the nightlight LED or LEDs 54. The photosensor circuit 50, which includes a photosensor 51 mounted on or exposed through an opening formed in one of the front wall portion 6 or side wall 9 of the main body 3 of the housing 2 that senses a low ambient light condition, will allow current to pass therethrough to a regulator or DC-to-DC converter circuit 52, which will drop the five volts to approximately three volts to selectively power the LED or the LEDs 54 to illuminate the light pipe 56 for the nightlight function. The regulator or DC-to-DC converter circuit 52 may, in one form of the present invention, include a zener diode, or in another form, a voltage divider circuit, or, alternatively, a voltage regulator integrated circuit.

The nightlight of the present invention also preferably includes a current selectable USB charger circuit and switch SW1, such as disclosed in U.S. Patent Application Ser. No. 61/571,878, filed on Jul. 7, 2011, and entitled "Current Selectable USB Charger", and U.S. patent application Ser. No. 13/542,828, filed on Jul. 6, 2012, and entitled "Current Selectable USB Charger", the disclosure of each of which is incorporated herein by reference.

More specifically, electronic devices, including cellular telephones and personal electronic devices, such as the iPad™ and iPod™ products, require device specific chargers to recharge their internal batteries. For example, some devices require a 2.1 ampere current to recharge, while others require a one (1) ampere current. As such, chargers are frequently not interchangeable, requiring each electronic device to have a specific charger.

Many electronic devices utilize a USB (Universal Serial Bus) connector and cable to charge their internal batteries. When the charger is connected to the electronic device, the device senses the capabilities of the charger connected thereto by determining the voltage at the D+ (DATA+) and D− (DATA−) pins on the USB connector. Charging devices commonly set the D+ and D− pins of their connectors to specific relative values to indicate the capabilities of the charger. For example, a charger in which the D+ pin is set to a relative low of 2 volts and the D− pin is set to a relative high of 2.7 volts would be indicating that it is capable of charging at a relatively low current, such as 1 ampere. Similarly, a charger in which the D+ pin is set to a relative high of 2.7 volts and the D− pin is set to a relative low of 2 volts would be indicating that it is capable of charging at a relatively high current, such as 2.1 amperes. If the device determines that the charger is only capable of supplying an inappropriate current, the device may not be compatible with the charger and may not accept the charge. For example, an iPod™ device usually requires a charger that supplies a 1 ampere current. If an iPod™ device is connected to a charger that identifies itself by the relative voltages on the D+ and D− pins as being capable of supplying a 2.1 ampere current, the iPod™ device may not accept the charge. As such, it is necessary for a user to use device-specific chargers to charge personal electronic devices. To overcome this problem, some universal chargers have two USB connectors for charging at either 2.1 amperes on one connector or 1 ampere on the other connector. The nightlight charger of the present invention overcomes the inherent disadvantages of conventional charging devices.

As can be seen in FIG. 3B of the drawings, the nightlight charger of the present invention includes a charging profile configuration circuit situated in the interior cavity of the housing 2. The charging profile configuration circuit includes a crossover switch SW1 (also referred to herein as a charging profile selection switch) mounted on a wall of the housing 2 so that it is exposed to the user. The charging profile configuration circuit further includes a pair of voltage dividers 30, 32 which receive the +5 volt DC output of the power supply situated in the internal cavity defined by the main body 3 of the housing 2.

The USB port P1, preferably mounted on the front wall 6 of the housing, includes a plurality of pins, including at least one power pin P1-1 (on which is preferably +5 volts DC), also referred to herein as a charge pin, which is used for charging an external electronic device connected to the charger, a D− pin P1-2, a D+ pin P1-3 and a ground pin P1-4. The nightlight charging circuit is electrically connected to a personal or other type of electronic device by extending a USB cable or the like between the USB port P1 of the nightlight and the mating connector of the electronic device.

The crossover switch SW1 is in electrical communication with a pair of voltage dividers 30, 32 to alternate the voltages at the D− pin P1-2 and the D+ pin P1-3 on the USB port P1 so that a plurality of electronic devices may be compatible with and utilize the charging circuit of the nightlight. More specifically, and referring to FIG. 3B of the drawings, it can be seen that the crossover switch SW1 is preferably constructed as a double pole, triple throw switch, but may be constructed in an alternative form as a double pole, double throw switch formed of first and second sections which are ganged together, as disclosed in the aforementioned U.S. Patent Application Ser. Nos. 61/571,878 and 13/542,828.

More specifically, the first wiper or common contact 22 of the first section of the switch SW1 is connected to the D− pin P1-2 of the USB port P1. Also, the second wiper or common contact 24 of the second section of the switch SW1 is connected to the D+ pin P1-3 of the USB port P1. The first output contact 26 of the first section of the switch SW1 is connected to the resistor junction of the first voltage divider 30, and the second output contact 28 of the first section of the switch SW1 is connected to the resistor junction of the second voltage divider 32.

The first output contact 34 of the second section of the switch SW1 is connected to the resistor junction of the second voltage divider 32, and the second output contact 36 of the second section of the switch SW1 is connected to the resistor junction of the first voltage divider 30.

The third output contact 60 of the first section of the switch SW1 is connected to the third output contact 62 of the second section of the switch SW1, and these third contacts 60, 62 are not connected to either of the first and second voltage divider 30, 32 and are, in essence, floating, at least when the USB port P1 is not connected to an external electronic device. Thus, for applications where the charging circuit is envisioned to charge a Blackberry Playbook™ device, the switch SW1 is moved by the user into its third position where an electrical circuit is made between the first wiper or common contact 22 and the third output contact 60 of the first section of the switch SW1, and between the second wiper or common contact 24 and the third output contact 62 of the second section of the switch SW1, so that the D− pin P1-2 and the D+ pin P1-3 on the USB port P1 of the nightlight are provided with no voltages from the voltage dividers 30, 32. Then, the Blackberry Playbook™ device will be compatible with the charging circuit of the nightlight of the present invention and accept charge from the charging circuit, which is capable of providing 1.8 amperes of current or more to charge the Playbook™ device.

The first voltage divider 30 preferably includes a first resistor R1 and a second resistor R2 connected in series to the first resistor R1. One end of the first resistor R1 is connected to the +5 volt DC output of the power supply. One end of the second resistor R2 is connected to ground. The junction defined by the interconnected ends of the first and second resistors R1, R2 is connected to the first output contact 26 of the first section of the switch SW1 and the second output contact 36 of the second section of the switch SW1.

Similarly, the second voltage divider 32 preferably includes a third resistor R3 and a fourth resistor R4 connected in series to the third resistor R3. One end of the third resistor R3 is connected to the +5 volt DC output of the power supply. One end of the fourth resistor R4 is connected to ground. The junction defined by the interconnected ends of the third and fourth resistors R3, R4 is connected to the second output contact 28 of the first section of the switch SW1 and the first output contact 34 of the second section of the switch SW1.

By selecting the values of the pairs of interconnected resistors R1, R2 and R3, R4, the first voltage divider 30 preferably provides an output voltage (also referred to herein as a first configuration voltage) at its resistor junction of one of +2 volts DC and +2.7 volts DC, and the second voltage divider 32 preferably provides an output voltage (also referred to herein as a second configuration voltage) at its resistor junction of the other of +2 volts DC and +2.7 volts DC.

In a first switch position of the crossover switch SW1, the D− pin P1-2 on the USB port P1 is set to the output voltage of the first voltage divider 30, and the D+ pin P1-3 is set to the output voltage on the second voltage divider 32. By switching the crossover switch SW1 to a second position, the voltages at the D− pin P1-2 and the D+ pin P1-3 are swapped, as the D− pin P1-2 is now set to the output voltage of the second voltage divider 32 and the D+ pin P1-3 is set to the output voltage of the first voltage divider 30.

Conventionally, when a rechargeable electronic device is connected to a standard charger, many devices will only accept charge if the voltages at the D− pin and the D+ pin, corresponding to the specific output charging current of the charger, match the charging specification of the electronic device. For example, some devices require that the D− pin have a relative high voltage value such as 2.7 volts and the D+ pin have a relative low voltage value such as 2 volts. Alternatively, some devices require that the D− pin have a relative low voltage value such as 2 volts and the D+ pin have a relative high voltage value such as 2.7 volts. As such, although the charger may be capable of supplying sufficient current to the electronic device, the device may not accept charge from the charger unless the relative voltages match the device's specifications.

The crossover switch SW1 and voltage dividers 30, 32 in electrical communication therewith allow the relative voltages on the D− and the D+ pins P1-2, P1-3 to be swapped so that the charging circuit of the nightlight may be selectively adapted to meet the charging specifications of the electronic device connected thereto. For example, an iPad™ personal electronic device utilizes a charger supplying a current of about 2.1 amperes. When the iPad™ device is connected to the charger, the device evaluates the voltages at the D− and D+ pins P1-2, P1-3 to verify that a proper charger is connected thereto. If the D− pin P1-2 is set to a relative low voltage such as 2 volts, and the D+ pin P1-3 is set to a relative high voltage such as 2.7 volts, corresponding to a charger having approximately a 2.1 ampere supply current matching the specification of the iPad™ device, the device will be compatible with the charger and accept charge from the charger to charge its internal battery. However, if the voltages at the D− and D+ pins P1-2, P1-3 are a relative high such as 2.7 volts and a relative low such as 2 volts, respectively, the iPad™ device will not accept charge from the charger and will not allow the charger to charge the battery of the device. To reconfigure the voltages at the D− and D+ pins P1-2, P1-3 without the need to change chargers or connectors, the position of the crossover switch SW1 of the charging circuit of the nightlight of the present invention may be changed to swap the relative voltages at the D− and D+ pins P 1-2, P 1-3, thereby matching the relative voltages at the pins to the specifications of the iPad™ device so that the iPad™ device will accept charge from the charging circuit of the nightlight to charge its internal battery. As long as the nightlight charging circuit can provide sufficient current, for example, three (3) amperes, on the power or charge pin P1-1 of the USB port P1 to meet the charging requirements of the electronic device to which it is connected, it will charge the internal battery of the electronic device.

As also shown in FIG. 3B of the drawings, preferably the first voltage divider 30 includes a first resistor R1, having a value of 43.2 K ohms, and a second resistor R2, having a value of 49.9 K ohms. Furthermore, preferably the second voltage divider 32 includes a third resistor R3, having a value of 75 K ohms, and a fourth resistor R4, having a value of 49.9 K ohms. Such values of the resistors R1-R4, when the voltage dividers 30, 32 are connected between a +5 volt DC source and ground, will provide the desired 2.0 volts and 2.7 volts on either the D− pin P1-2 or the D+ pin P1-3 of the USB port P1 of the nightlight of the present invention.

Figure 4A:
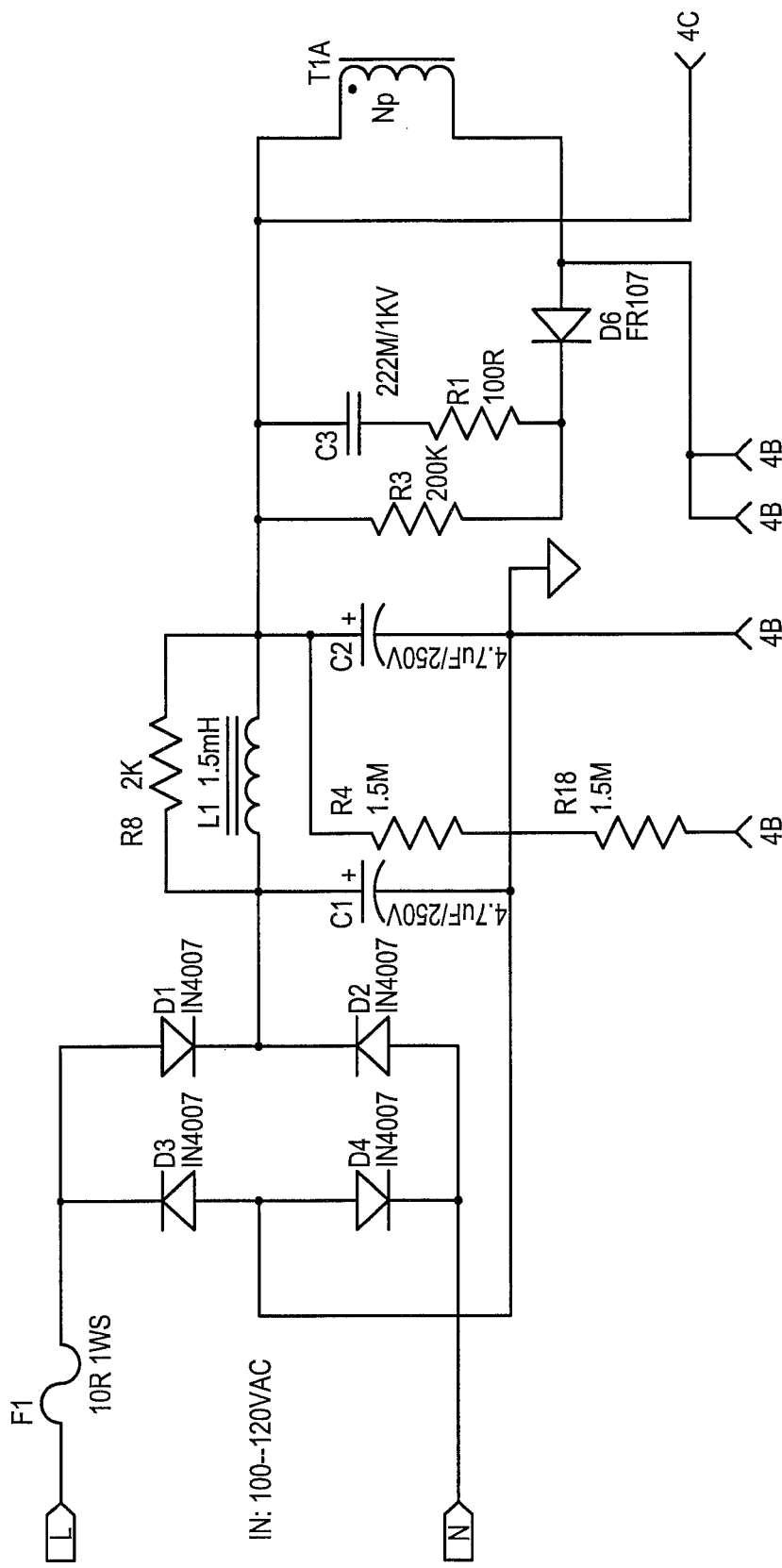
FIGS. 4A, 4B and 4C are portions of is a schematic diagram of an electronic circuit of the nightlight charger of the present invention.
Figure 4B:
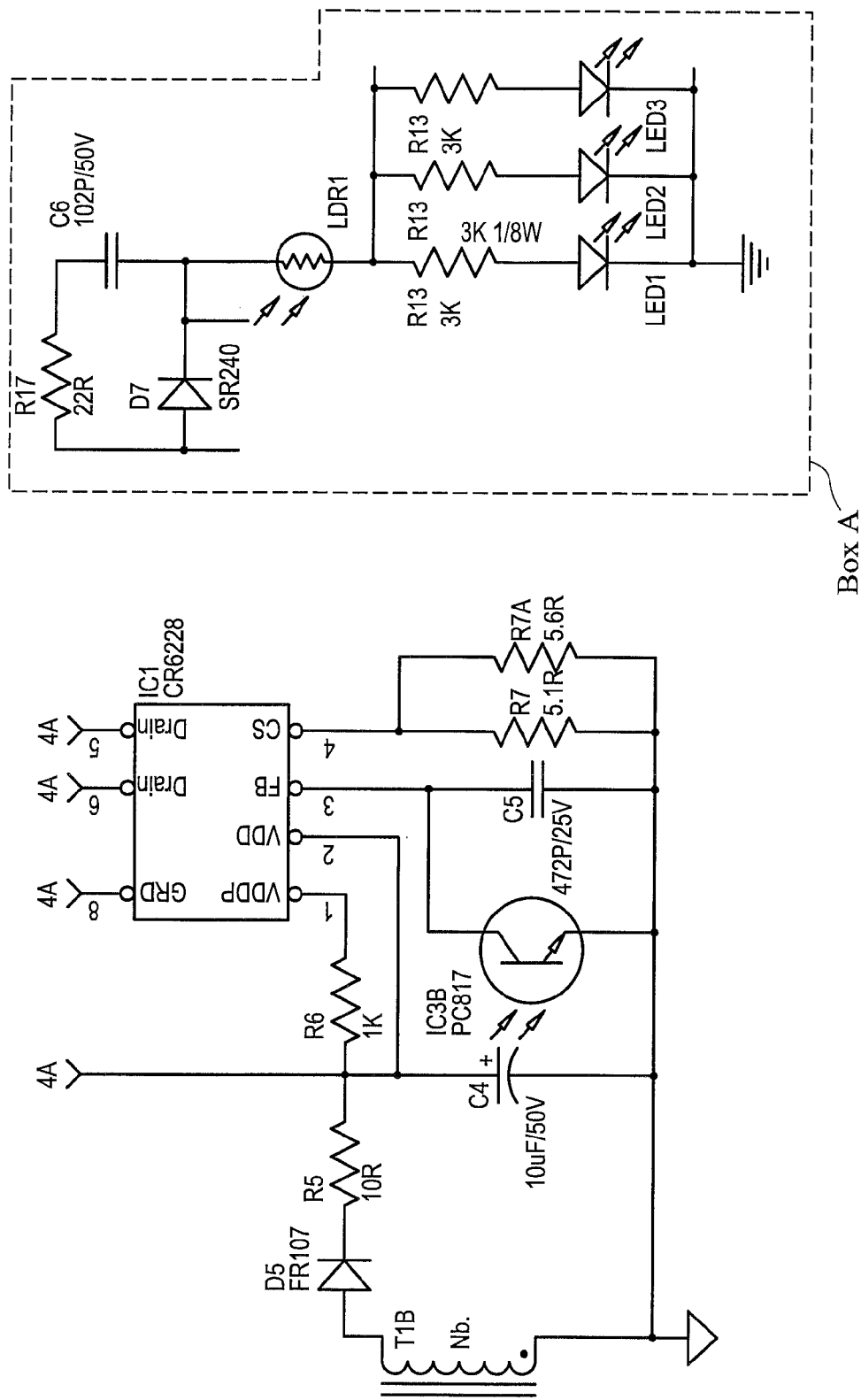
Figure 4C:
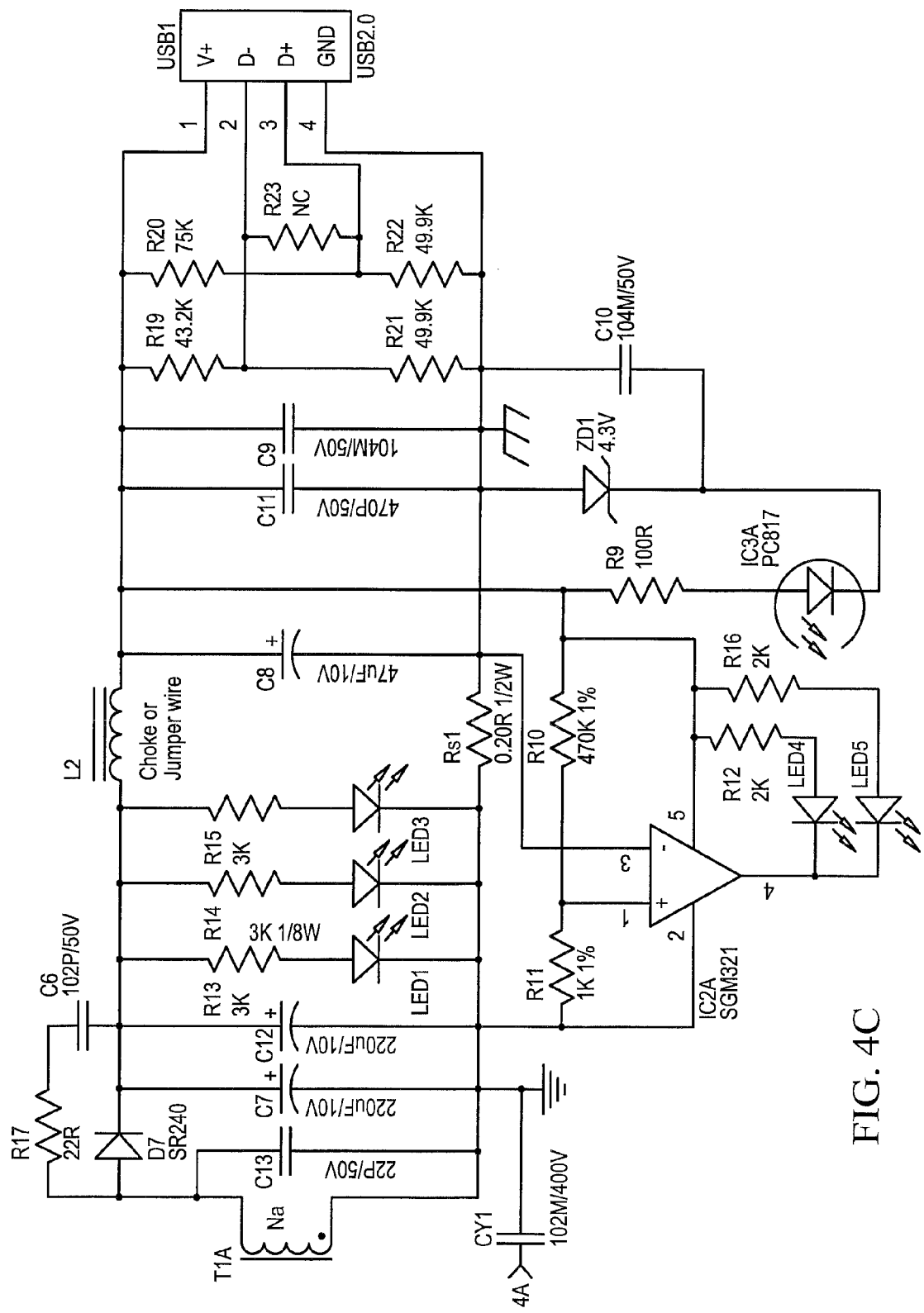

FIGS. 4A, 4B and 4C are portions of a schematic diagram of a preferred circuit used in the nightlight of the present invention. An optional photosensing circuit 50 to control the illumination of the LEDs 54 and light pipe 56 is shown in Box A on FIG. 4B. A photosensor 51 (LDRI in FIG. 4B) senses the ambient light condition and allows or disallows current to pass therethrough to three LEDs 54 (LED1, LED2, LED3 in FIG. 4B), depending on the ambient light condition. In this embodiment, the LEDs 54 emit a white light. The charging status indicator 16 includes LED4 and LED5, which will turn on with an amber color when the USB charger is activated. Also, the integrated circuit IC1 in FIG. 4B is a current mode Pulse Width Modulated (PWM) power switch having Part No. CR6228 manufactured by Sinopex Electronics Co. Ltd. of Taiwan.

As can be seen from FIG. 4 of the drawings, in another preferred form of the nightlight charger of the present invention, the changeover switch SW1 may be omitted, as is also shown in FIGS. 2A-2E of the drawings, and the charging profile configuration circuit comprising the first voltage divider 30 and the second voltage divider 32 may be connected directly to the D− pin and the D+ pin of the USB port P1. In the schematic diagram of FIG. 4C, the first voltage divider 30 includes resistors R19 and R21 connected in series in the same manner and having the same preferred values as resistors R1 and R2, respectively, shown in the block diagram of FIG. 3B. Similarly, in FIG. 4C, the second voltage divider 32 includes resistors R20 and R22 connected in series in the same manner and having the same preferred values as resistors R3 and R4, respectively, shown in the block diagram of FIG. 3B. The junction between resistors R19 and R21 of the first voltage divider 30 is connected directly to the DATA− (D−) pin of the USB port USB1, and the junction between resistors R20 and R22 of the second voltage divider 32 is connected directly to the DATA+ (D+) pin of the USB port USB 1. Although the nightlight charger of the embodiment shown in FIG. 4 may not have the versatility of the nightlight charger embodiment shown in FIGS. 3A and 3B, it is still capable of charging a number of external electronic devices which are connected thereto using a cable having a corresponding mating USB connector.

It is also envisioned to be within the scope of the present invention to have more than one USB port (for example, two USB ports) mounted on the front wall 6 of the main body 3 of the housing 2. Each USB port may be connected through a changeover switch SW1 to first and second voltage dividers 30, 32. Alternatively, one of the USB ports may be connected directly to the first and second voltage dividers 30, 32, such as shown in FIG. 4 of the drawings, and the other, second USB port may be connected to a third voltage divider and a fourth voltage divider, the resistors of which have resistance values which are selected to provide a desired voltage on the D− and D+ pins of the second USB port in a manner similar to that which is shown in FIG. 4 of the drawings so that the user may choose either the first USB port or the second USB port to use for charging his external electronic device.

Also, as shown in FIG. 4C of the drawings, the three LEDs 54 (LED1, LED2, LED3) may be continuously illuminated, rather than selectively illuminated and controlled by the photosensor LDR1; therefore, in this alternative embodiment, the photosensor LDR1 is omitted, and the LEDs 54 (LED1, LED2, LED3) are continuously provided with a voltage from the power conversion circuit, including transformer, T1A, through a forward biased, voltage dropping diode D7.

To restate some of the features of the nightlight charger of the present invention, the nightlight charger preferably is mountable on an AC wall outlet 4, for charging an external electronic device, and includes a housing 2, the housing 2 having a main body 3. The main body 3 includes a front wall 6, a rear wall 10 situated opposite the front wall 6, and a side wall 9 extending between the front wall 6 and the rear wall 10. The main body 3 of the housing 2 defines an interior cavity.

The nightlight charger further includes power outlet prongs 12 mounted on and extending outwardly from the rear wall 10 of the main body 3 of the housing 2. The power outlet prongs 12 are receivable by an AC wall outlet 4 to allow the nightlight charger to be mounted on and supported by the AC wall outlet 4.

There is at least one USB port P1 situated on the front wall 6 of the main body 3 of the housing 2. The at least one USB port P1 includes a charge pin P1-1, a DATA+ pin P1-3 and a DATA− pin P1-2. The at least one USB port P1 is provided with a charge voltage on the charge pin P1-1 thereof for charging an external electronic device electrically connected to the at least one USB port P1, a first configuration voltage on one of the DATA+ pin P1-3 and the DATA− pin P1-2 thereof and a second configuration voltage on one of the DATA− pin P1-2 and the DATA+ pin P1-3 thereof.

The nightlight charger also includes a power conversion circuit situated within the interior cavity of the main body 3 of the housing 2. The power conversion circuit is electrically coupled to the power outlet prongs 12 and converts an AC voltage provided on the AC wall outlet 4 on which the nightlight charger is mounted to a DC voltage. The charge voltage provided to the charge pin P1-1 of the at least one USB port P1 is derived from the DC voltage from the power conversion circuit.

Also included in the nightlight charger is at least one charging profile configuration circuit situated within the interior cavity of the main body 3 of the housing 2. The at least one charging profile configuration circuit is responsive to the DC voltage from the power conversion circuit and generates the first configuration voltage provided to one of the DATA+ pin P1-3 and the DATA− pin P1-2 of the at least one USB port P1 and the second configuration voltage provided to one of the DATA− pin P1-2 and the DATA+ pin P1-3 of the at least one USB port P1.

The nightlight charger also includes a light emitting device 54. The light emitting device 54 is at least one of mounted on and situated in the main body 3 of the housing 2. The light emitting device 54 either selectively illuminates or continuously illuminates to emit light from the main body 3 of the housing 2.

In a preferred form of the present invention, the nightlight charger further includes a charging profile selection switch SW1 mounted on the main body 3 of the housing 2. The charging profile selection switch SW1 is selectively changeable between at least a first state and a second state. The charging profile selection switch SW1 is responsive to the first configuration voltage and the second configuration voltage provided by the at least one charging profile configuration circuit and provides the first configuration voltage to the DATA+ pin P1-3 and the second configuration voltage to the DATA− pin P1-2 of the at least one USB port P1 when the charging profile selection switch SW1 is in the first state, and provides the first configuration voltage to the DATA− pin P1-2 and the second configuration voltage to the DATA+ pin P1-3 when the charging profile selection switch SW1 is in the second state.

Preferably, the at least one charging profile configuration circuit of the nightlight charger includes at least a first voltage divider network 30 and a second voltage divider network 32, the first voltage divider network 30 generating the first configuration voltage, and the second voltage divider network 32 generating the second configuration voltage. Preferably, the first voltage divider network 30 includes at least a first resistor R1 and a second resistor R2, the first resistor R1 being connected in series with the second resistor R2. Furthermore, preferably, the second voltage divider network 32 includes at least a third resistor R3 and a fourth resistor R4, the third resistor R3 being connected in series with the fourth resistor R4.

In another form of the present invention, the nightlight charger includes a photosensor 51. The photosensor 51 is at least one of mounted on and exposed through a first opening 53 formed in the main body 3 of the housing 2. The photosensor 51 senses ambient light conditions and generates an output signal in response thereto. The light emitting device 54 selectively illuminates in response to the output signal generated by the photosensor 51.

In another preferred form of the nightlight charger, at least a portion 14 of the side wall 9 of the main body 3 of the housing 2 is formed from a material which is at least partially light transmissive. The light emitted by the light emitting device 54 passes through the at least partially light transmissive portion 14 of the side wall 9.

The nightlight charger may further include a light pipe 56. The light pipe 56 is disposed in proximity to the light emitting device 54 and to the at partially light transmissive portion 14 of the side wall 9 of the main body 3 of the housing 2. The light emitted by the light emitting device 54 is received by the light pipe 56 and is directed by the light pipe 56 to pass through the at least partially light transmissive portion 14 of the side wall 9.

In yet another preferred form of the nightlight charger of the present invention, the housing further includes an end cap 8. The end cap 8 is mountable on the rear wall 10 of the main body 3 of the housing 2 to cover the power outlet prongs 12 extending from the rear wall 10 and is selectively removable from the rear wall 10 to uncover the power outlet prongs 12.

Also, preferably, the nightlight charger further includes a charging status indicator 16. The charging status indicator 16 is viewable from the front wall 6 of the main body 3 of the housing 2 and selectively illuminates to indicate that an external electronic device connected to the at least one USB port P1 is charging.

Thus, the charging circuit of the nightlight formed in accordance with the present invention provides selectable charge profile voltages on the D+ pin and D− pin of the USB charging port P1 to accommodate a host of rechargeable electronic devices, limiting the need for device specific chargers or a charger with multiple connectors. The charging circuit of the nightlight may be connected to the electronic device and the appropriate charge profile voltages may be selected by manipulating the crossover switch SW1.

Although illustrative embodiments of the present invention have been described herein with reference to the accompanying drawings, it is to be understood that the invention is not limited to those precise embodiments and that various other changes and modifications may be effected herein by one skilled in the art without departing from the scope or spirit of the invention.

What is claimed is:

1. A nightlight charger, mountable on an AC wall outlet, for charging an external electronic device, which comprises:

a housing, the housing having a cylindrical main body, the cylindrical main body including a front wall, a rear wall situated opposite the front wall, and a side wall extending between the front wall and the rear wall, the cylindrical main body of the housing defining an interior cavity, the main body being segmented to define a front cylindrical portion and a rear cylindrical portion situated adjacent to the front cylindrical portion, the side wall of the main body having a first section forming part of the front cylindrical portion and a second section forming part of the rear cylindrical portion, the first section of the side wall being formed of an at least partially light transmissive material;

power outlet prongs mounted on and extending outwardly from the rear wall of the main body of the housing, the power outlet prongs being receivable by an AC wall outlet to allow the nightlight charger to be mounted on and supported by the AC wall outlet;

at least one USB port situated on the front wall of the cylindrical main body of the housing, the at least one USB port including a charge pin, a DATA+ pin and a DATA− pin, the at least one USB port being provided with a charge voltage on the charge pin thereof for charging an external electronic device electrically connected to the at least one USB port, a first configuration voltage on one of the DATA+ pin and the DATA− pin thereof and a second configuration voltage on one of the DATA− pin and the DATA+ pin thereof;

a charging status indicator, the charging status indicator being in the form of a ring which encircles the at least one USB port and being situated on and viewable from the front wall of the main body of the housing and selectively illuminating to indicate that an external electronic device connected to the at least one USB port is charging;

a power conversion circuit situated within the interior cavity of the main body of the housing, the power conversion circuit being electrically coupled to the power outlet prongs and converting an AC voltage provided on the AC wall outlet on which the nightlight charger is mounted to a DC voltage, the charge voltage provided to the charge pin of the at least one USB port being derived from the DC voltage from the power conversion circuit;

at least one charging profile configuration circuit situated within the interior cavity of the main body of the housing, the at least one charging profile configuration circuit being responsive to the DC voltage from the power conversion circuit and generating the first configuration voltage provided to one of the DATA+ pin and the DATA− pin of the at least one USB port and the second configuration voltage provided to one of the DATA− pin and the DATA+ pin of the at least one USB port;

at least one light emitting device, the at least one light emitting device being at least one of mounted on and situated in the main body of the housing, the light emitting device one of selectively illuminating and continuously illuminating to emit light from the main body of the housing, the light emitted by he at least one light emitting device being viewable through the at least partially light transmissive first section of the side wall of the cylindrical main body;

wherein the diameter of the main body of the housing is dimensioned such that the main body covers only one receptacle of an AC wall outlet when the nightlight charger is mounted thereon and does not cover an adjacent receptacle of the AC wall outlet to allow the adjacent receptacle to be used for other purposes.

2. A nightlight charger as defined by claim 1, which further comprises:

a charging profile selection switch mounted on the main body of the housing, the charging profile selection switch being selectively changeable between at least a first state and a second state, the charging profile selection switch being responsive to the first configuration voltage and the second configuration voltage provided by the at least one charging profile configuration circuit and providing the first configuration voltage to the DATA+ pin and the second configuration voltage to the DATA− pin of the at least one USB port when the charging profile selection switch is in the first state, and providing the first configuration voltage to the DATA− pin and the second configuration voltage to the DATA+ pin when the charging profile selection switch is in the second state.

3. A nightlight charger as defined by claim 1, wherein the at least one charging profile configuration circuit includes at least a first voltage divider network and a second voltage divider network, the first voltage divider network generating the first configuration voltage, and the second voltage divider network generating the second configuration voltage.

4. A nightlight charger as defined by claim 3, wherein the first voltage divider network includes at least a first resistor and a second resistor, the first resistor being connected in series with the second resistor; and wherein the second voltage divider network includes at least a third resistor and a fourth resistor, the third resistor being connected in series with the fourth resistor.

5. A nightlight charger as defined by claim 1, which further comprises:

a photosensor, the photosensor being at least one of mounted on and exposed through a first opening formed in the main body of the housing, the photosensor sensing ambient light conditions and generating an output signal in response thereto;

wherein the at least one light emitting device selectively illuminates in response to the output signal generated by the photosensor.

6. A nightlight charger as defined by claim 1, which further comprises:

a light pipe, the light pipe being disposed in proximity to the at least one light emitting device and to the at least partially light transmissive first section of the side wall of the main body of the housing;

wherein light emitted by the at least one light emitting device is received by the light pipe and is directed by the light pipe to pass through the at least partially light transmissive first section of the side wall.

7. A nightlight charger as defined by claim 1, wherein the housing further includes an end cap, the end cap being mountable on the rear wall of the main body of the housing to cover the power outlet prongs extending from the rear wall and being selectively removable from the rear wall to uncover the power outlet prongs.

\* \* \* \* \*